Figure 1:
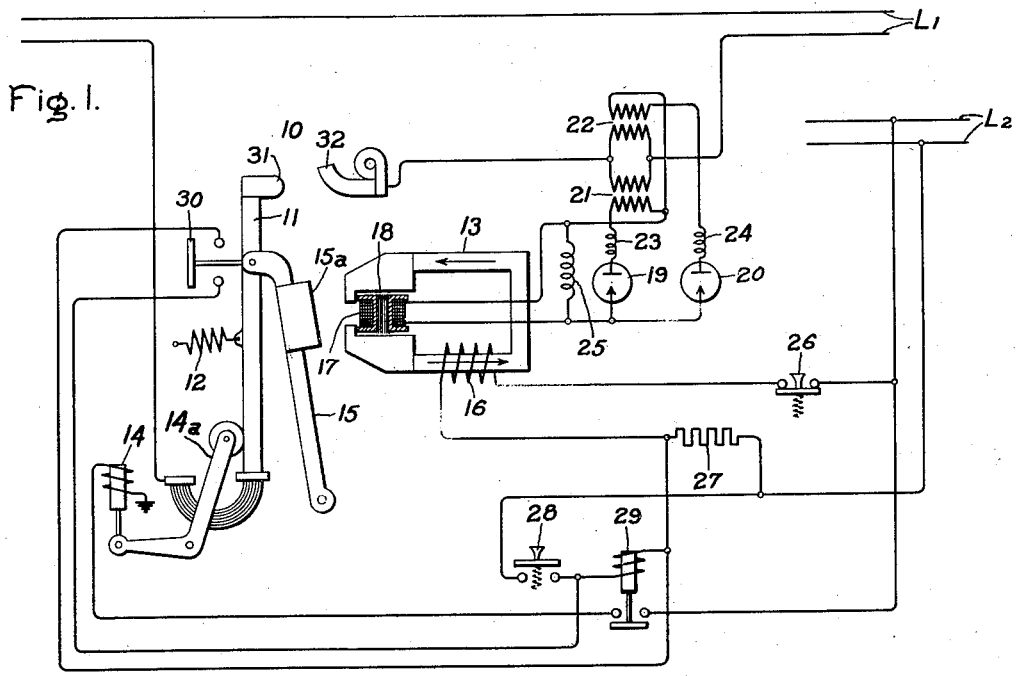

April 29, 1930. J. W. McNAIRY 1,756,923
ELECTRORESPONSIVE DEVICE
Filed June 22, 1925

Inventor:
Jacob W. McNairy,
by
His Attorney.

Patented Apr. 29, 1930

1,756,923

UNITED STATES PATENT OFFICE

JACOB W. McNAIRY, OF SCHENECTADY, NEW YORK, ASSIGNOR TO GENERAL ELECTRIC COMPANY, A CORPORATION OF NEW YORK

ELECTRORESPONSIVE DEVICE

Application filed June 22, 1925. Serial No. 38,631.

My invention relates to improvements in electroresponsive devices, particularly electroresponsive switching apparatus, such as circuit interrupters, relays and the like, for use in alternating current circuits or in continuous current circuits in which the direction of current flow may reverse, and the invention has for its object the provision of improved means for effecting a quick response of devices of the above character upon the sudden occurrence of predetermined conditions, such as overloads and the like, in the circuit.

More specifically, the present invention makes it possible to produce an alternating current electroresponsive device capable of operating upon the occurrence of overload conditions in response to the rate of increase of the alternating current as distinguished from the instantaneous or the effective value of the current. Moreover, by means of my invention an electroresponsive device may be arranged to operate at extraordinarily high speed in response to an abnormal flow of current in either direction in the circuit and the speed at which the device responds may be varied as desired.

Briefly, in carrying my invention into effect, I provide means, including a suitable rectifier, for producing a unidirectional current which is a function of the instantaneous or effective value of the alternating current and, in the preferred form of the invention, I arrange to energize the electroresponsive device in accordance with the rate of increase of the unidirectional current which is supplied through the rectifier upon an abnormal increase in the alternating current. In this way the operation of the electroresponsive device may be effected responsively to the rate of change of the alternating current entirely independently of the instantaneous or effective value of the current.

Although of general application to electroresponsive switching apparatus, in certain aspects the present invention is particularly advantageous when embodied in a quick acting circuit interrupter of the type described and broadly claimed in the Reissue Patent No. 15,441 to John F. Tritle, dated August 29, 1922. In the Tritle type of circuit interrupter the movable circuit interrupting member is strongly biased to the open position and is held electromagnetically in the closed position. The release of the circuit interrupting member is effected by a winding or current conductor which is arranged to decrease the holding effect of the flux of the holding electromagnet instantly upon the flow of current of predetermined value through the releasing winding or current conductor in a predetermined direction.

By means of my present invention the releasing winding or current conductor of an electroresponsive circuit interrupter of the Tritle type may be supplied with a unidirectional energizing current which depends upon the rate of change of the current in an alternating current circuit and which is always in the predetermined direction required to effect operation of the movable circuit interrupting member even under asymmetrical short circuit overload condition when the current in the alternating current circuit oscillates entirely above or below the normal zero value. Likewise, in what I shall term "reversible" continuous current circuits, where the flow of current may be in either direction, as in railway regenerative braking systems or other similar service, my invention enables a circuit interrupter of the Tritle type to afford protection against rapidly increasing overload current in either direction since the unidirectional energizing current for the releasing conductor is not only dependent upon the rate of change of the overload current but is always maintained by the rectifier in the proper direction for releasing the circuit interrupting member, regardless of the direction in which the current in the circuit is flowing.

Thus it will be seen that, by means of my invention, the releasing conductor of the Tritle type of circuit interrupter may be energized in accordance with the rate of the change in the unidirectional current which is supplied through the rectifier upon a sudden or abnormal surge of current in the circuit, such as ordinarily results upon a short circuit, in order that the movable circuit interrupting member may be released with such extreme speed as to interrupt the circuit before the current reaches the maximum value.

In the accompanying drawings I have illustrated several forms of my invention. Fig. 1 diagrammatically shows the invention embodied in a high speed interrupter adapted for either alternating or reversible continuous current circuits; Figs. 2, 3 and 4 are circuit diagrams showing modified arrangements of the current rectifying means employed in the arrangement shown in Fig. 1; and Fig. 5 illustrates a high voltage three phase alternating current circuit breaker of the oil break type embodying the invention.

Referring to Fig. 1, the circuit interrupter 10 is connected to control the opening and closing of the circuit including the supply lines $L_1$ which may carry either alternating current or continuous current that may flow in either direction.

Figures 2, 3, 4, 5:
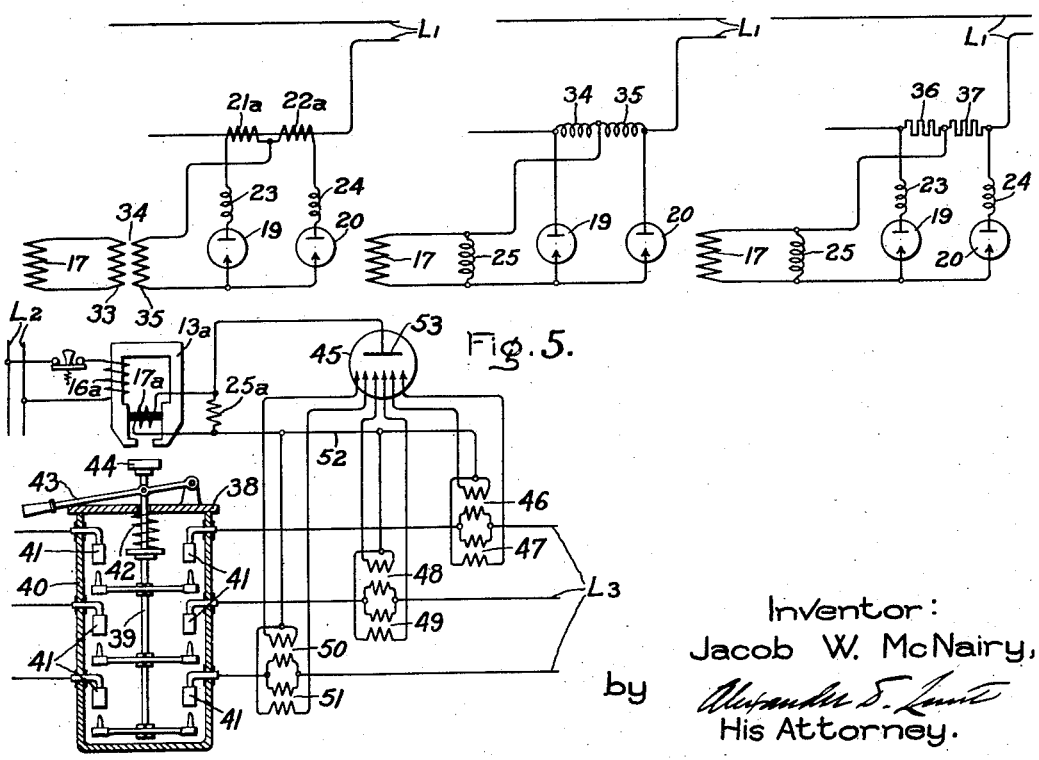

The interrupter 10 is illustrated diagrammatically as a single pole air break switch having a magnetic arc blowout, but for high voltage multiphase alternating current circuits it will be understood that an interrupter of the multiple pole oil break type provided with suitable arc suppressing chambers, as diagrammatically illustrated in Fig. 5, preferably is employed. The interrupter 10 as shown in Fig. 1 is of the high speed flux shifting type fully described and broadly claimed in the previously mentioned Tritle Reissue Patent No. 15,441, and comprises essentially the circuit controlling member 11 which is strongly biased to the circuit opening position by the spring 12, and is arranged to be held in the circuit closing position by the holding electromagnet 13, when operated thereto by the electrically operated closing mechanism 14. The circuit controlling member 11 is pivotally mounted upon the rotatable arm 15 and is arranged to trip free when an excessive current flows in the alternating current circuit upon closure of interrupter 10 as is more fully described and claimed in Patent No. 1,560,440 issued to John F. Tritle November 3, 1925.

The winding 16 of the holding electromagnet 13 is normally energized from a suitable unidirectional source of current indicated as the supply lines $L_2$. When normally energized the winding 16 supplies a unidirectional flux of sufficient value to hold the magnetic member $15_a$ carried by the rotatable arm 15 in engagement with the poles of the electromagnet 13 against the opposing strain of the biasing spring 12 and thus maintain the circuit controlling member 11 in the circuit closing position. As set forth more in detail in the above Tritle Reissue Patent No. 15,441 August 29, 1922, and as more particularly described and claimed in Patent No. 1,506,483 issued August 26, 1924, to Leonhard Haag, a winding or current conductor 17 is associated with the holding electromagnet 13 for diverting the holding flux from the magnetic member $15_a$ through the magnetic path 18 to permit the circuit interrupter to open in accordance with its bias. With the winding 16 energized to set up a unidirectional holding flux in the electromagnet 13 in the direction indicated by the arrows in the drawing, the holding flux is diverted from the magnetic member $15_a$ only when the releasing winding 17 is supplied with energizing current in a predetermined direction. When the releasing winding 17 is energized with current in the reverse direction, the flux set up by the winding will tend to maintain the magnetic member $15_a$ in engagement with the holding electromagnet 13 and thus hold the circuit interrupter closed.

In accordance with my present invention the rectifying devices 19 and 20, together with the current transformers 21 and 22, are provided in order to supply a unidirectional energizing current to the releasing winding 17 of the interrupter 10, which is a function of the current in the alternating or reversible continuous current circuit, and which is always in the direction required to effect release of the magnetic member 15 regardless of the direction of the flow of current in the supply lines $L_1$. The rectifying devices 19 and 20 may be of any suitable form and hence need not be more specifically described herein, although I prefer to employ rectifiers of the electrolytic type having a tantalum cathode. The current transformers 21 and 22 may be of the ordinary type employed in alternating current circuits, or a transformer having a double secondary winding may be employed if desired. The rectifiers 19 and 20 and the transformers 21 and 22 are connected as shown in the drawing so that with an alternating current in the supply lines $L_1$ the rectifier 19 serves to rectify current during one half of the current wave, while the rectifier 20 serves to rectify the alternating current during the other half of the current wave. In this way the unidirectional current supplied to the releasing winding 17 of the circuit interrupter 10 is always in the direction required to effect operation of the interrupter to the circuit opening position. Suitable reactors 23 and 24 may be connected in the rectifier circuit as shown to smooth out the ripples in the rectified current if desired.

In order to render the circuit interrupter 10 responsive to the rate of change of the alternating current in the supply lines $L_1$, I provide a shunt 25 which is of relatively high inductance and is connected in parallel circuit with the releasing winding 17 to be energized by the unidirectional current supplied by the rectifiers 19 and 20. The relatively high inductance of the shunt 25 serves to force an increasing portion of the unidirectional current through the releasing winding 17 upon the occurrence of a rapid rise in the unidirectional current due to a rush or surge of the current in the alternating current circuit. By properly proportioning the inductance in the shunt 25 relatively to the inductance of the releasing winding 17, operation of the interrupter 10 may be effected upon increase of the current in the alternating current circuit to one value when the rate of change of the current is below a predetermined value while the operation of the interrupter will be effected upon an increase in the current in the alternating current circuit to a lower value when the rate of change of the current is above the predetermined value. Furthermore, by properly proportioning the relative resistance, as well as the inductance, of the winding 17 and the shunt 25, it is possible to effect operation of the interrupter 10 only when the rate of increase of the current in the alternating current circuit is above a preselected value. Thus, by designing the winding 17 with a relatively high resistance and low inductance, and designing the shunt 25 with a relatively low resistance and a high inductance, the operation of the interrupter 10 may be effectively prevented even with the maximum value of current in the alternating current circuit unless the rate of increase of the current to the maximum value exceeds a preselected value.

It will be evident that with a reversible continuous current in the supply lines $L_1$, the transformer 21 and the rectifying device 19 will serve to supply a unidirectional current to the releasing winding 17 which is proportional to the rate of change of continuous current in the supply lines $L_1$ in one direction, while the transformer 22 and the rectifying device 20 will supply a unidirectional current to the releasing winding 17 under similar conditions of current flow in the reverse direction. Thus, with reversible continuous current in the supply lines $L_1$, the inductive shunt 25 may be dispensed with and the circuit interrupter 10 will operate in response to a predetermined rate of change of the current flowing in either direction in the circuit independently of the value of the current.

As shown in Fig. 1, the energizing circuit of the holding winding 16 is under the control of a normally closed push button 26 and the current in the energizing circuit of the holding winding is limited by the resistor 27. If desired, the normally open push button 28 and the relay 29, together with the auxiliary contact 30 of the movable circuit controlling member 11, may be provided and arranged to over-excite the holding winding 16 during the closure of the circuit controlling member 11 in the manner described and claimed in the co-pending joint application of John F. Tritle and myself, Serial No. 6,304, filed February 2, 1925, although this is not of the essence of my present invention.

The operation of the circuit interrupting arrangement shown in Fig. 1 is as follows: With the supply lines $L_1$ and $L_2$ suitably energized, closure of the push button 28 energizes the operating winding of the relay 29 in parallel circuit with the current limiting resistor 27 of the normally energized holding winding 16. The resulting closure of the relay 29 energizes the electromagnetic closing mechanism 14 of the circuit interrupter 10 from the direct current supply line $L_2$ and the closing mechanism serves to move the pivotally mounted roller arm $14_a$ to the right, thereby quickly operating the circuit controlling member 11 toward the closing position until the magnetic member $15_a$ is brought into engagement with the holding electromagnet 13. This closes the auxiliary contact 30 which short circuits the operating winding of the relay 29 with the push button 18 maintained in the closed position and the relay 29 opens to deenergize the electromagnetic closing mechanism 14 and permit the contact 31 of the movable circuit controlling member 11 to engage with the stationary contact 32 and close the alternating current circuit. The flux of the holding winding 16 temporarily is increased when the resistor 27 is shunted by the operating winding of relay 29 and the holding flux is further increased when the resistor 27 and the parallel connected winding of relay 29 are short circuited by the auxiliary contact 30. This over-excitation of the holding winding during the closure of the interrupter effectively insures that the movable circuit controlling member 11 is held in the closed position.

With the supply lines L energized from an alternating current source, the unidirectional current supplied to the releasing winding 17 through the rectifying devices 19 and 20 and the current transformers 21 and 22 during normal conditions in the alternating current circuit is insufficient to divert the normal holding flux of winding 16 from the magnetic member $15_a$ and permit the interrupter to open. With a substantially uniform unidirectional current through the rectifying devices 19 and 20 and with the releasing winding 17 and the shunt 25 of substantially equal resistance and the shunt 25 of relatively high inductance, the unidirectional current will divide substantially equally between the releasing winding 17 and the shunt 25 under normal conditions in the alternating current circuit. Under these conditions a gradual increase in the value of the alternating current in the circuit will cause a correspondingly increased energization of the releasing winding 17. When the energizing current of the winding 17 reaches a predetermined value sufficient flux will be diverted from the magnetic member $15_a$ to permit the biasing spring 12 to overcome the holding effect of the electromagnet 13 and quickly operate the circuit controlling member 11 to the circuit opening position.

If, however, a severe overload or short circuit should occur in the alternating current circuit, the resulting rush or surge of the alternating current will produce a correspondingly rapid increase in the unidirectional current passing through the rectifying devices 19 and 20. Under these conditions the high inductance of the shunt 25 forces an increased proportion of the unidirectional current through the releasing winding 17 and, consequently, the circuit controlling member 11 is released at a lower value of current in the alternating current circuit than under the gradually increasing overload conditions considered above. Due to the quick release of the circuit controlling member 11 and the high speed at which it is operated by the biasing spring 12, the circuit may be interrupted before an overload or short circuit alternating current of commercial power frequencies, such as a frequency as high as 60 cycles, passes through a half cycle. Furthermore, by properly coordinating the speed of operation with the period in the alternating current wave at which the circuit controlling member 11 is released, the circuit interrupter 10 may be arranged to open the circuit as the current in the alternating current circuit passes through the zero value, thus effectively eliminating arcing at the contacts of the interrupter.

In case the releasing winding 17 is designed with an exceptionally high resistance and a relatively low inductance and, on the other hand, the shunt 25 is designed with a low resistance and a relatively high inductance, the interrupter 10 may be made unresponsive to even the maximum value of the alternating current in the circuit if the current is gradually increased, while the interrupter is instantly responsive to a much lower value of the current when the rate of change of the current in the alternating current circuit is above a predetermined value.

Should operation of the interrupter 10 be desired only in response to an abnormal increase in the rate of change of the current in the alternating current circuit, the modified arrangement shown diagrammatically in Fig. 2 may be employed for energizing the releasing winding 17 of the interrupter. It will be observed that in this arrangement the inductive shunt 25 is eliminated and the releasing winding 17 of the interrupter is connected to the secondary winding of a transformer 34. The current transformers $21_a$ and $22_a$ and the current rectifiers 19 and 20 are arranged to supply the primary winding 35 of the transformer 34 with a unidirectional current which is a function of the alternating current in the supply lines L in substantially the same manner as previously described. Upon a gradual increase in the value of the unidirectional current responsively to a corresponding change in the alternating current, the energizing current for the releasing winding 17 induced in the secondary winding 33 is of relatively negligible value. However, upon a rush or surge of current in the alternating current circuit, such as ordinarily occurs under severe overload or short circuit conditions, the resulting rapid increase in the unidirectional current supplied to the primary winding 35 of the transformer serves to induce a relatively large energizing current for the releasing winding 17 in the secondary winding 33. The energizing current of winding 17 is always in the predetermined direction required to instantly release the circuit controlling member 11 as previously pointed out. The current transformers $21_a$ and $22_a$ may be connected in series in one of the alternating current lines $L_1$ as indicated in Fig. 2 instead of in parallel relation as shown in Fig. 1, if desired.

In the modification shown in Fig. 3 suitable reactors 34 and 35 are inserted in the alternating current circuit and connected through the rectifiers 19 and 20 to supply the unidirectional current to the releasing winding 17 and the inductive shunt 25 in lieu of the current transformers 21 and 22 illustrated in Fig. 1. In this case the inductance of the reactors 34 and 35 may serve to smooth out the ripples in the rectified current supplied to the releasing winding 17 without requiring additional reactors in the circuit.

If desired, the releasing winding 17 may be energized through the rectifiers 19 and 20 from non-inductive resistors 36 and 37 inserted in the alternating current circuit, as indicated in Fig. 4. The reactors 23 and 24 may be employed to prevent undue pulsations in the unidirectional current in case the inductance of the winding 17 is insufficient for this purpose. With a reversible continuous current in the supply lines $L_1$, the arrangement shown in Fig. 4 is particularly advantageous since it permits the releasing winding 17 to be sufficiently energized to effect the operation of the interrupter 10 with one value of current in either direction in the circuit when the rate of change of the current is below a certain value, while causing the releasing winding 17 to be energized to effect operation of the interrupter 10 at a lower value of current in either direction in the supply lines when the rate of change of current is above the predetermined value.

As shown in Fig. 5, the three phase alternating current supply lines $L_3$ are protected against overload current by the high speed circuit interrupter 38, which is of the oil break type having the three pole movable switch member 39 operating within the oil tank 40. For high voltage, high power service the stationary contacts cooperating with the blades of the movable switch member 39 may be provided with arc-suppressing chambers 41 of the usual type, as indicated in the drawing. The switch member 39 is strongly biased to the open position by the spring 42 and is operated to the closed position by suitable means such as the closing lever 43. A magnetic member 44 is secured to the movable switch member 39, and upon closure of the switch is arranged to be held in engagement with the poles of an electromagnet $13_a$ having a normally energized holding winding $16_a$ and a releasing winding $17_a$ arranged in the same manner as previously described in connection with the holding electromagnet 13 in Fig. 1.

In order to energize the releasing winding $17_a$ so as to permit the switch member 39 to open in accordance with its bias upon the occurrence of abnormal conditions in the alternating current circuit, the inductive shunt $25_a$ is connected to the terminals of the releasing winding $17_a$ and a rectifying device 45, together with the several pairs of current transformers 46 and 47, 48 and 49, 50 and 51, are connected as indicated in the drawing to supply a unidirectional energizing current to the releasing winding $17_a$ of a value which depends upon both the value of the alternating current in the three phase supply lines $L_3$, as well as the rate of change of the three phase alternating current. It will be observed that the primary windings of each pair of current transformers are connected in multiple in one of the supply lines $L_3$, while the secondary windings are connected in series with their voltages opposed. The mid point of each of the pairs of secondary windings is connected through the conductor 52 to the releasing winding $17_a$ and the inductive shunt $25_a$, while the end terminals of the pairs of secondary windings are connected to separate electrodes of the rectifying device 45, these electrodes cooperative with a common electrode 53 to supply the unidirectional current to the other terminal of the releasing winding $17_a$ and the shunt $25_a$. However, it will be evident that individual rectifying devices of the type shown in Fig. 1, as well as series connected current transformers, or reactors, or resistors, as described in connection with Figs. 2, 3 and 4, may be employed in lieu of the multiple connected pairs of current transformers and the multi-electrode rectifying device 45 if desired.

The operation of the high speed circuit interrupter shown in Fig. 5 is as follows:—Operation of the closing lever 43 moves the switch member 39 from the open position in which it is shown to the closed position in which the circuit through each of the three phase supply lines $L_3$ is completed.

With the supply lines $L_2$ energized from a suitable source of direct current, the normally energized holding winding $16_a$ produces sufficient flux in the electromagnet $13_a$ to maintain the magnetic member 44 in engagement with the poles of the electromagnet against the opening bias of the spring 42. With the normal value of current flowing in the three phase supply lines $L_3$, a substantially uniform unidirectional current is supplied from the several pairs of current transformers through the rectifying device 45 to the releasing winding $17_a$, the shunt $25_a$, which, however, is insufficient to effect the release of the magnetic member 44. Upon the occurrence of overload conditions in the three phase supply lines $L_3$, the flow of the unidirectional current supplied to the releasing winding $17_a$ is increased. With a steadily increasing overload current in the supply lines $L_3$, the magnetic member 44 is released upon the flow of a predetermined value of unidirectional current through the releasing winding $17_a$. Upon a rapid increase in the current in the supply lines $L_3$, such as may occur under short circuit conditions, the inductive shunt $25_a$ serves to force an increasing proportion of the unidirectional current through the releasing winding $17_a$ in the manner previously described and consequently the magnetic member 44 is released to permit the switch member 39 to open at a relatively lower value of current in the supply lines $L_3$, depending upon the rate of increase of the current in the alternating current circuit.

While I have illustrated and described several forms of rectifying arrangements embodying the present invention which are adapted to release a quick acting circuit interrupter, it will be apparent to those skilled in the art that the invention may be modified in various ways and applied with equal advantage to cause operation of other forms of electroresponsive devices. Thus, it will be evident that the winding 17, or $17_a$, may constitute the operating or controlling winding of any electroresponsive device which it may be desired to operate in response to the rate of change of an alternating current. Where a quick or instantaneous response of the device to the rate of change of the alternating current is not essential, one of the rectifiers shown in Figs. 1 to 4 of the drawing may be omitted and only a single rectifier employed to supply the unidirectional energizing current to the winding 17.

Likewise, where a plurality of high speed circuit controlling devices embodying my invention are employed in an alternating current system wherein it is desired that one device should operate very quickly in response to abnormal circuit conditions, while another device should operate more slowly, the releasing or operating winding of the second device may be shunted by a non-inductive resistor or a condenser instead of the inductive shunt as previously described in order to thereby delay the response of the second device for a slight interval, such as a fraction of a second after the operation of the first device.

What I claim as new and desire to secure by Letters Patent of the United States, is:

1. In an electroresponsive device, the combination of a movable member, means responsive to the rate of change in an electrical condition of an alternating current circuit for effecting movement of said memper upon a predetermined rate of change thereof and means associated with the said first means for amplifying the responsiveness thereof to the said rate of change.

2. An alternating current electroresponsive circuit controlling device comprising a movable circuit controlling member, means responsive to the rate of change of the effective value of an alternating current arranged to cause operation of said member when the rate of change of the effective value of the current is above a predetermined value and means associated with the said first means for amplifying the responsiveness thereof to said rate of change.

3. An alternating current electroresponsive circuit controlling device comprising a movable circuit controlling member, means for producing a direct current varying in accordance with the alternating current, and means responsive to both the rate of change of the direct current and the value thereof arranged to cause operation of said member when the current and the rate of change of the current are above predetermined values.

4. In an alternating current electroresponsive device, means for producing a direct current varying in accordance with the alternating current, the combination of a movable member, and electromagnetic means responsive to the rate of change of the direct current and arranged to cause movement of the said member upon an increase in the current to one value when the rate of increase of the current is below a predetermined value and to cause movement of the said member upon an increase in the current to a lower value when the rate of increase of the current is above said predetermined value.

5. In combination, a controlling device for an alternating current circuit, an electromagnet having a winding for controlling the operation of said device, an alternating current to direct current rectifying device interconnected between said winding and the alternating current circuit controlled by said controlling device and means responsive to the rate of change of the direct current supplied to said winding by said rectifying device for controlling the energization of said winding to effect operation of the device upon a predetermined rate of change of the current in the circuit.

6. In combination, an alternating current load circuit, a circuit controlling device for said circuit, and means responsive to rate of change of current arranged to cause operation of said device only upon a predetermined rate of change of the current in said load circuit.

7. In combination, an alternating current load circuit, a circuit controlling device for said circuit, an electromagnet having a winding for controlling the operation of said device, and means responsive to the rate of change of current arranged to control the energization of said winding to effect operation of the said circuit controlling device only upon a predetermined rate of change of the current in said load circuit.

8. In combination, an alternating current load circuit, a circuit controlling device for said circuit having a movable circuit controlling member biased to one circuit controlling position, an electromagnet for holding the said member in another circuit controlling position, and means responsive to the rate of change of current in said load circuit arranged to control the holding effect of said electromagnet to permit operation of said member to its biased position only upon a predetermined rate of change of current in the circuit.

9. In an electroresponsive circuit controlling device for alternating or reversible continuous current circuits, the combination of a current conductor for controlling the operation of said device upon the flow of current in a predetermined direction through the conductor and means responsive to an increase in the current in the circuit and including a current rectifying device for supplying current to the said conductor in the said predetermined direction to permit operation of the said device in a time interval depending upon the rate of increase of the current in the circuit in either direction.

10. In an electroresponsive circuit controlling device for alternating or reversible continuous current circuits, the combination of a current conductor for controlling the operation of said device upon the flow of current in a predetermined direction through the conductor, and means responsive to the rate of change of current in the circuit and including a current rectifying device connected between said conductor and the circuit whereby upon an increase in the current in the circuit in either direction, the said conductor is supplied with current in said predetermined direction to permit operation of the device when the rate of change of the current exceeds a predetermined value.

11. An electroresponsive device for alternating or reversible continuous current circuits comprising a winding, a movable magnetic member operable under the control of said winding and arranged to be operated upon the flow of current in a predetermined direction through the said winding, and means responsive to rate of change of current and including a rectifying device for energizing said winding to permit operation of said member upon a predetermined increase in the rate of change of current flowing in either direction in the circuit.

12. An electroresponsive device for alternating or reversible continuous current circuits comprising a current conductor, a movable member under the control of the said conductor and arranged to be operated upon the flow of a predetermined value of current through the conductor in a predetermined direction, and means responsive to rate of change of current and including a rectifying device connected to the circuit and an inductive shunt connected to the terminals of said conductor for energizing the conductor in said predetermined direction upon an increase in the rate of change of the current flowing in either direction in the circuit.

13. In an electroresponsive device for alternating current circuits, the combination of a winding for controlling the operation of the device, a shunt for said winding having inductive characteristics differing therefrom, and current rectifying means connected to supply a unidirectional current to said winding and said shunt in accordance with the current in the alternating current circuit whereby upon an increase in the value of the alternating current in the circuit from normal the said winding is energized responsively to the rate of change of the alternating current to permit operation of said device.

14. In a high speed interrupter for alternating current circuits, the combination of a movable circuit controlling member, means for biasing the member to move quickly from the closed position to the open position, electromagnetic means for normally holding the member in the closed position, a rectifying device arranged to be energized from the alternating current circuit and means including a current conductor and an inductive shunt therefor arranged to be energized from said rectifying device in a predetermined direction upon a change in the condition of the alternating current circuit from normal in accordance with the rate of change of said conditions for releasing the member with such speed that it may interrupt an alternating current power circuit of commercial frequency before the current passes through the half cycle.

15. A high speed interrupter for alternating current circuits comprising a quick acting circuit breaker having a normally opened circuit controlling member held electromagnetically in the closed position and arranged to be released under the control of an electroresponsive holding flux diverting means, and means whereby upon a change in the condition of an alternating current power circuit from normal during either half cycle, said holding flux diverting means is energized in accordance with the rate of change of said conditions to permit the circuit controlling member to operate to the circuit opening position in accordance with its bias.

16. A high speed interrupter for alternating current circuits comprising a switch member biased to open position, an electromagnet for holding the same in the closed position, a releasing winding associated with said electromagnet for decreasing the holding effect thereof to permit said switch member to open in accordance with its bias upon the flow of current of predetermined value in a predetermined direction through the winding, and means responsive to the rate of change of the effective value of the current in the alternating current circuit and including an inductive device and rectifiers for both half cycles of the alternating current connected to supply unidirectional current of said predetermined value and direction to said releasing winding upon an increase in the current in the alternating current circuit above a predetermined rate.

In witness whereof, I have hereunto set my hand this 19th day of June, 1925.

JACOB W. McNAIRY.